(12) United States Patent
Stadtlander et al.

(10) Patent No.: US 9,071,957 B2
(45) Date of Patent: Jun. 30, 2015

(54) SYSTEM AND METHOD FOR EMERGENCY COMMUNICATIONS

(71) Applicant: STADSON TECHNOLOGY, Boca Raton, FL (US)

(72) Inventors: Andrew Stadtlander, Highland Beach, FL (US); Matthew Hudson, Boca Raton, FL (US)

(73) Assignee: STADSON TECHNOLOGY, Boca Raton, FL (US)

( * ) Notice: Subject to any disclaimer, the term of this patent is extended or adjusted under 35 U.S.C. 154(b) by 25 days.

(21) Appl. No.: 13/891,223

(22) Filed: May 10, 2013

(65) Prior Publication Data

US 2014/0024333 A1    Jan. 23, 2014

Related U.S. Application Data

(60) Provisional application No. 61/674,643, filed on Jul. 23, 2012, provisional application No. 61/768,836, filed on Feb. 25, 2013.

(51) Int. Cl.
*H04M 11/04* (2006.01)
*H04W 4/22* (2009.01)

(52) U.S. Cl.
CPC ...................... *H04W 4/22* (2013.01)

(58) Field of Classification Search
CPC ...... H04W 4/22; H04W 76/007; H04W 64/00
USPC ..................... 455/404.2, 404.1, 456.1, 414.1
See application file for complete search history.

(56) References Cited

U.S. PATENT DOCUMENTS

| 6,442,241 | B1 | 8/2002 | Tsumpes |
| 7,221,928 | B2 | 5/2007 | Laird et al. |
| 7,825,820 | B2 | 11/2010 | Lee |
| 8,351,916 | B2 | 1/2013 | Fan et al. |
| 2001/0006892 | A1* | 7/2001 | Barnett et al. ................ 455/434 |

(Continued)

FOREIGN PATENT DOCUMENTS

| CN | 100371191 | 2/2008 |
| JP | 2002117465 | 4/2002 |

OTHER PUBLICATIONS

"Life360 family locator", Retrieved on Aug. 13, 2013, from http://appcrawlr.com/ios/life360-family-locator.

(Continued)

*Primary Examiner* — Nghi H Ly
(74) *Attorney, Agent, or Firm* — Novak Druce Connolly Bove + Quigg LLP

(57) ABSTRACT

The provision of emergency response services to a user can be based on transitioning a communications device associated with a user to a listening mode, setting a first timer, recording user actions with the communications device, ascertaining, based on a status of the first timer and the user actions, whether a criteria with respect to at least user interaction is met, and, if the criteria is met, transitioning the communications device to an emergency communications mode, else resetting the timer and repeating the recording and the ascertaining until the criteria is met. The emergency communication mode consists of forwarding user and live location information to a remote server and receiving emergency contact information, selected based on the user and live location information, for establishing a communication with emergency response personnel.

18 Claims, 7 Drawing Sheets

(56) References Cited

U.S. PATENT DOCUMENTS

| | | | |
|---|---|---|---|
| 2003/0104800 A1 | 6/2003 | Zak | |
| 2005/0124318 A1 | 6/2005 | Jeon | |
| 2011/0111728 A1 | 5/2011 | Ferguson et al. | |
| 2011/0319051 A1 | 12/2011 | Reitnour | |
| 2012/0052836 A1 | 3/2012 | Buratti et al. | |
| 2012/0238237 A1* | 9/2012 | Crestol | 455/404.2 |
| 2012/0329420 A1 | 12/2012 | Zotti et al. | |
| 2013/0052982 A1 | 2/2013 | Rohde et al. | |

OTHER PUBLICATIONS

"Research and markets: Smartphone futures 2012-2016: Worldwide market analysis and competitor positioning in the high-end handset market", Retrieved on Aug. 13, 2013, from http://www.businesswire.com/news/home/20120906005834/en/Research-Markets-Smartphone-Futures-2012-2016-Worldwide-Market.

CampusSafety, "$13M in school safety grants available", Retrieved on Aug. 13, 2013, from http://www.campussafetymagazine.com/Channel/School-Safety/News/2011/05/04/13M-in-School-Safety-Grants-Available.

Di Editorial Board, "Costly, obsolete emergency-phones should be scrapped", Retrieved on Aug. 13, 2013, from http://www.dailyiowan.com/2012/02/22/Opinions/27123.html.

FCC, "911 Wireless services", Retrieved on Aug. 13, 2013, from http://www.fcc.gov/guides/wireless-911-services.

Hibsch, "MU stands by blue-light emergency phone system", Retrieved on Aug. 13, 2013, from http://www.themaneater.com/stories/2010/9/14/mu-stands-blue-lights/.

Pepitone, "Android races past Apple in smartphone market share", Retrieved on Aug. 13, 2013, from http://money.cnn.com/2012/08/08/technology/smartphone-market-share/index.html.

* cited by examiner

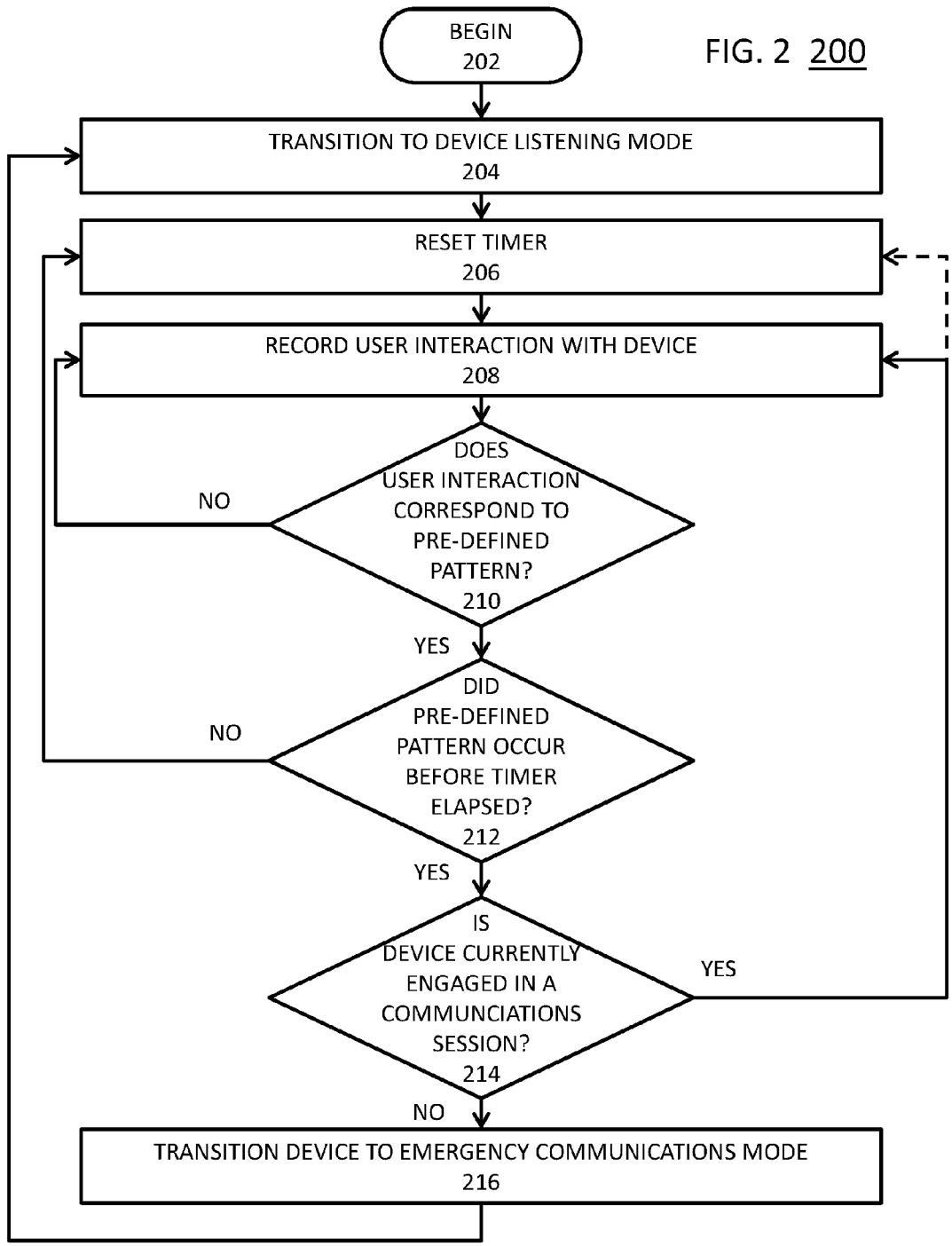

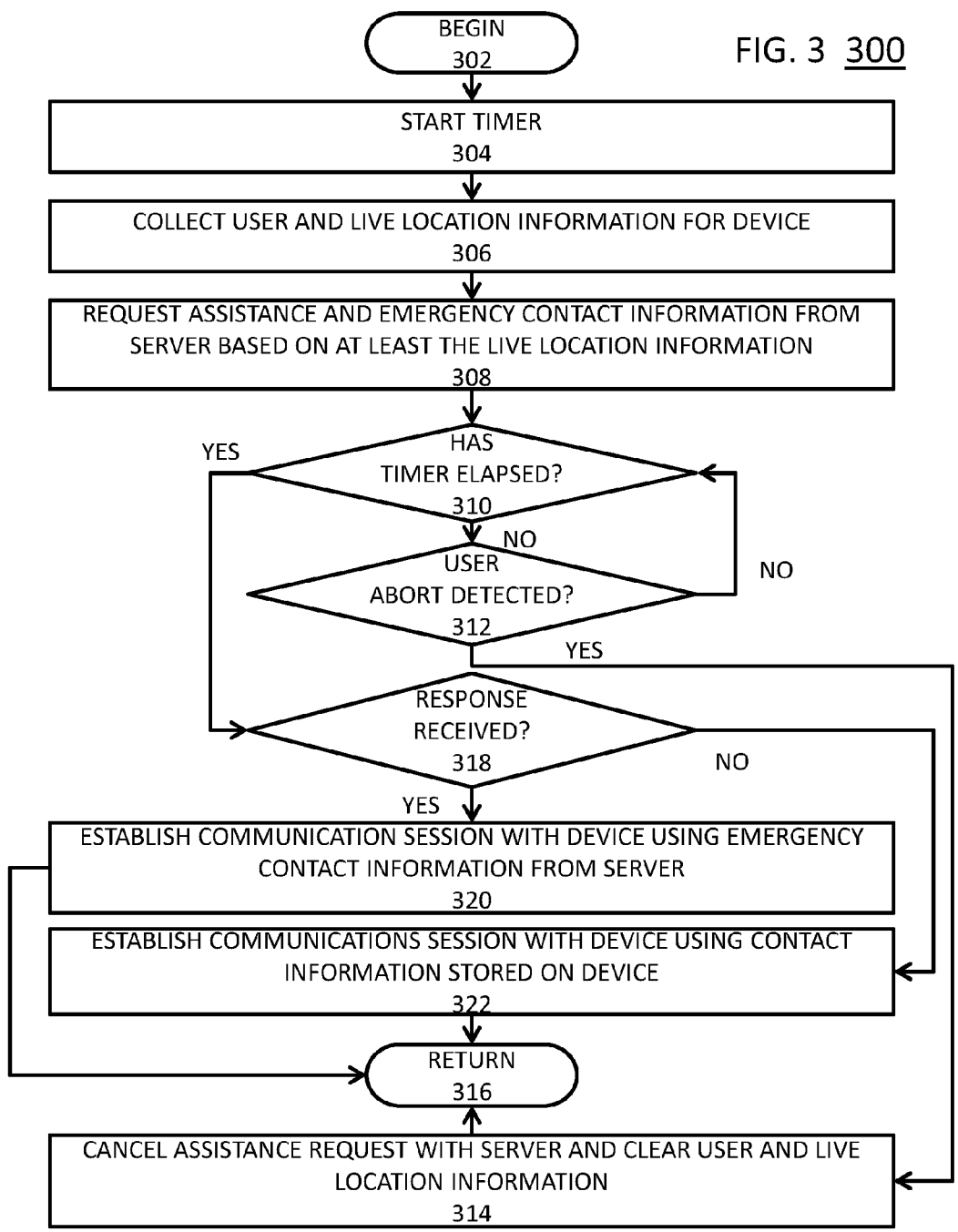

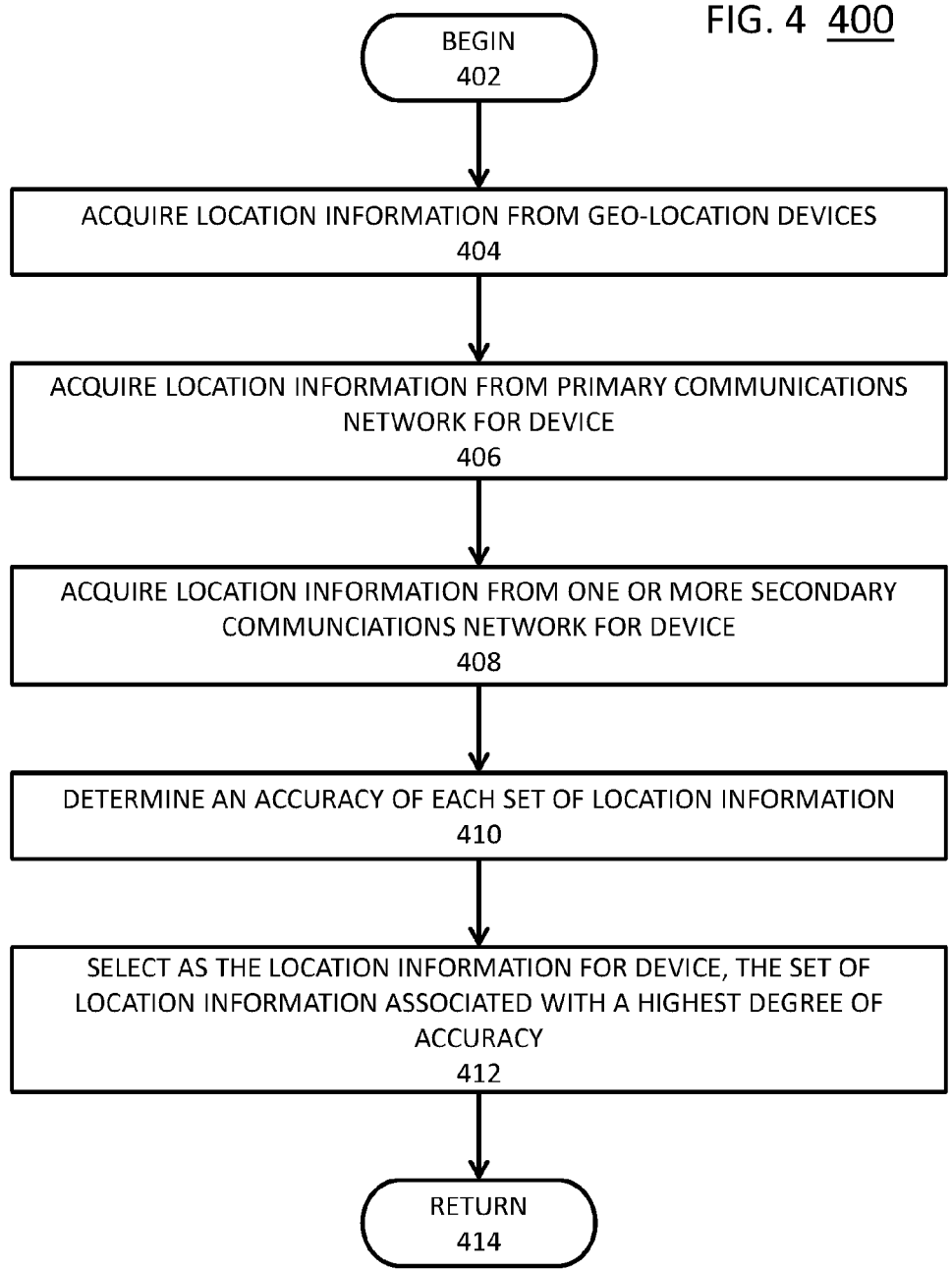

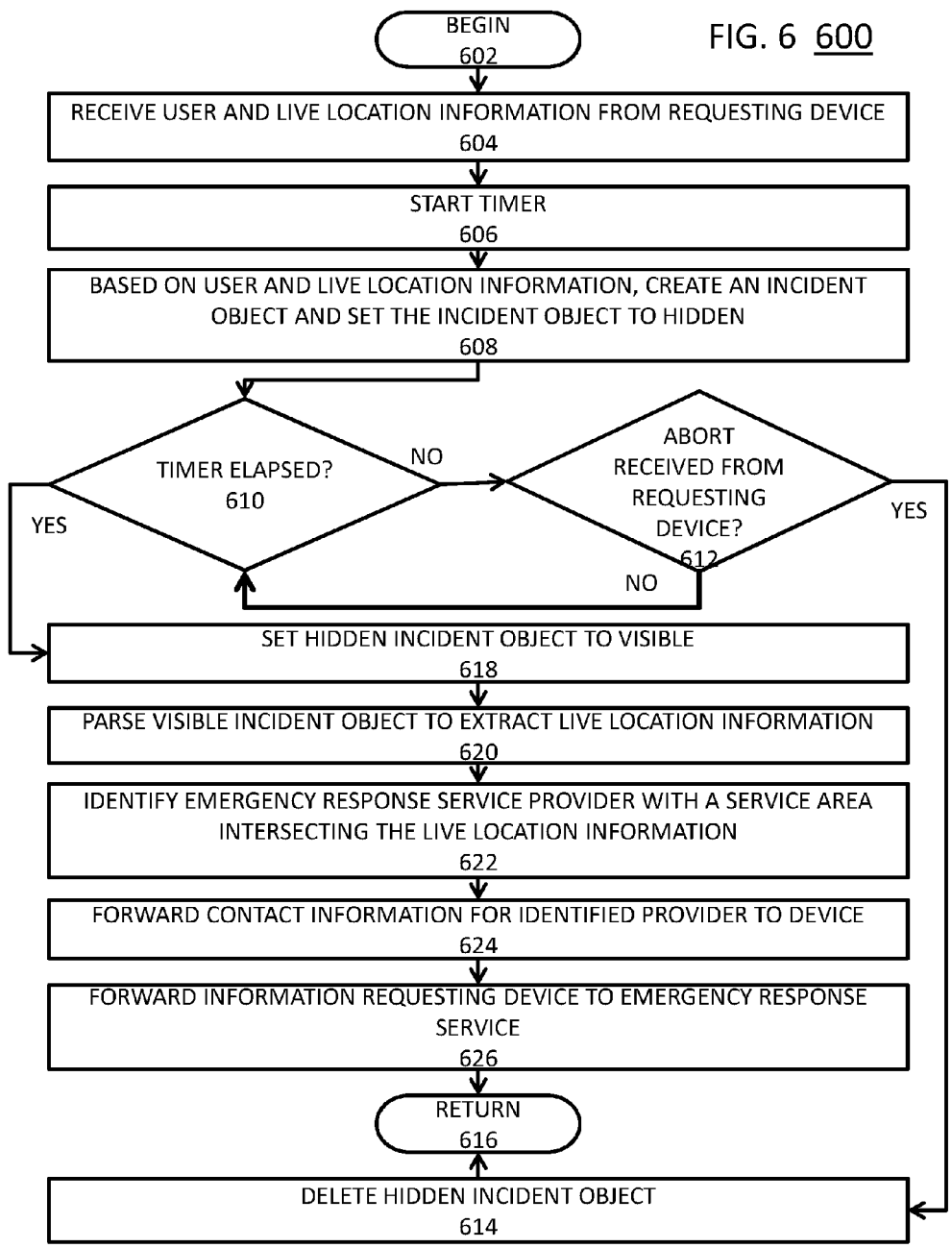

SYSTEM AND METHOD FOR EMERGENCY COMMUNICATIONS

CROSS-REFERENCE TO RELATED APPLICATIONS

This application claims priority to and the benefit of U.S. Provisional Application No. 61/674,643, filed Jul. 23, 2012 and entitled "METHOD, FUNCTIONALITY OF INITIATING AN EXTERNAL KEY(S) ON A MOBILE DEVICE THAT HAS A SERVICE RUNNING THAT LISTENS TO FLAG CHANGES AND/OR STATE CHANGES IN THE OPERATING SYSTEM THEREBY LAUNCHING AN APPLICATION, WHICH CONTACTS EMERGENCY SERVICE SPECIFIED REQUESTED", and U.S. Provisional Application No. 61768836, filed Feb. 25, 2013 and entitled "METHOD, FUNCTIONALITY OF INITIATING AN EXTERNAL KEY(S) ON A MOBILE DEVICE THAT HAS A SERVICE RUNNING THAT LISTENS TO FLAG CHANGES AND/OR STATE CHANGES IN THE OPERATING SYSTEM THEREBY LAUNCHING AN APPLICATION, WHICH CONTACTS EMERGENCY SERVICE SPECIFIED REQUESTED", the contents of both of which are herein incorporated by reference in their entirety.

FIELD OF THE INVENTION

The present invention relates to systems and methods for emergency communications, and more specifically to apparatus and methods for more providing establishing emergency communications between local emergency response personnel and a user via a simplified interaction between the user and the user's communications device.

BACKGROUND

Despite current social and economic advances, there still remains an overabundance of criminal activity in most societies. Unfortunately, the amount of resources for combating such criminal activity is typically limited. Accordingly, when criminal activity occurs, police and other law enforcement agencies typically rely on citizen calling for aid via specific, well-established communications channels. For example, in the United States, the telephone number 911 is utilized almost universally as a means to contact law enforcement agencies and other emergency response services. However, 911-based systems are limited in some aspects.

First, even though 911 services are accessible via virtually any telephone, they still rely on a dialing process. On a landline telephone or a basic mobile phone (i.e., other than a smartphone) the dialing process is trivial. However, on various other types of devices (smartphones, computers, tablet devices, etc. . . . ), additional steps can be required to establishing the call. For example, on a smartphone, a screen unlocking process may be required, followed by selection of an phone application. Still another difficulty is that in some scenarios, even the simple act of dialing 911 can be difficult. For example, an individual being robbed or assaulted may be under high stress conditions and therefore may be unable to properly dial 911 or operate his phone at all in a normal fashion. In another example, an injured individual may be physically unable to dial 911.

Second, seeking assistance via 911 can sometime be an inefficient process. For example, in some circumstances, the closest or most appropriate emergency response service may not be reached by the call. For example, a college or university may have their own on-campus emergency response services. However, a mobile phone call to 911 from a person on the campus would not typically reach such services. Rather, the call would go to a central 911 hub from which the campus emergency response services may be dispatched. As a result, it is possible that life threatening delays can occur while the campus emergency response services are contacted or dispatched.

One solution to the above-mentioned problems is the use of specialized emergency devices. However, such devices are typically limited. For example, some devices are merely act as a distress beacon, which may communicate location information, but no information regarding the present state of the user. For example, it is not uncommon to see the use of call stations on university campuses that provide one-button access to on-campus emergency response services. Thus, location information is provided when such a station is activated, but no information about the victim is provided. Further, such stations are generally fixed, so they rely on the victim being able to reach the station and for the victim to remain in proximity of the station.

Other devices may be associated with specific users, but such devices are restricted to sending a signal that contains a limited amount of vital content about the user or may rely on a third party dispatcher. For example, emergency response services such as the LIFE ALERT system of Life Alert Emergency Response, Inc., provide a remote control device that allows users to cause a speakerphone in their home to automatically place a call to a monitoring service. The monitoring service then contacts appropriate persons for responding to the user's emergency. Unfortunately, such systems typically require the use of specialized equipment. Further, such systems typically lack the capability to directly contact emergency services to begin dispatch of emergency response services immediately. As noted above, delays in dispatching emergency response personnel can have adverse, if not fatal, consequences for the user.

SUMMARY

Embodiments of the invention concern systems and methods for emergency communications. In a first embodiment, there is provided a computer-implemented method for establishing emergency communications. The method includes transitioning a communications device associated with a user to a listening mode and setting a first timer in the communications device. The method also includes recording, at the communications device, user actions with the communications device. The method also includes ascertaining, based on a status of the first timer and the user actions, whether the communications device meets criteria with respect to at least user interaction. In the method, if the communications device meets the criteria, the method includes transitioning the communications device to an emergency communications mode, else the method includes resetting the timer and repeating the recording and the ascertaining until the communications device meets the criteria.

In the method, the ascertaining can further comprises determining that the communications device meets the criteria by comparing a current pattern defined by the user actions with at least one pre-defined pattern of user action, where the communications device is determined to meet the criteria if the current pattern substantially matches the pre-defined pattern. The ascertaining can further include determining whether the timer has expired, where the communications device is determined to meet the criteria if the current pattern substantially matches the pre-defined pattern prior to the expiry of the first timer. In the method, the pre-defined pattern can be a pre-defined sequence of activation of user control elements on the communications device.

The method can also include preventing the communications device from transitioning to the emergency communication mode if the communications device is currently engaged in a persistent communications session. The persistent communications session can be, for example, one of a voice call or a video call.

The method can further include performing, responsive to transitioning to the emergency communication mode, the steps of setting a second timer in the communications device, collecting user information and live location information for the device, transmitting a request for assistance to a remote server, and establishing a communications session based on the second timer, where the communication session is established using default emergency contact information at the communications device if the second timer expires prior to receiving a response to the request from the remote server, else the communications session is established using emergency contact information in the response. In the method, the request can be cancelled and establishment of the communications session can be prevented when an abort signal is detected at the device.

In the method, the collecting of live location information can include acquiring one or more sets of location information for the device via at least one of a geo-location system associated with the device, a primary communications network for the device, and a secondary communications network to yield acquired location, determining an accuracy of each of the sets of location information, and selecting as the live location information the one of the sets of location information associated with the accuracy that is highest.

In a second embodiment, there is provided a communications device. The communications device includes a processor, at least one control element communicatively coupled to the processor, and a computer-readable medium. The computer-readable medium can have stored thereon a plurality of instructions for causing the processor to perform various steps. The steps include establishing a listening mode, setting a first timer, recording user actions with the at least one control element, and ascertaining, based on a status of the first timer and the user actions, whether criteria with respect to at least user interaction has been met. The steps further include transitioning the communications device to an emergency communications mode if the criteria have been met, else resetting the timer and repeating the recording and the ascertaining until the criteria is met.

In the communications device, the instructions for the ascertaining can further include instructions for causing the processor to determine that the communications device meets the criteria by comparing a current pattern defined by the user actions with at least one pre-defined pattern of user action, where the criteria is determined to be met if the current pattern substantially matches the pre-defined pattern.

In the communications device, the instructions for the ascertaining can further include instructions for causing the processor to determine whether the timer has expired and determining that the criteria is met if the current pattern substantially matches the pre-defined pattern prior to the expiry of the first timer. The pre-defined pattern can be a pre-defined sequence of activation of the at least one control element.

In the communications device, the instructions can further include instructions for causing the processor to prevent the transitioning to the emergency communications mode if the communications device is currently engaged in a persistent communications session. The persistent communications session can be one of a voice call or a video call.

The communications device can further include at least one communications interface communicatively coupled to the processor and the instructions can further include instructions for causing the processor to perform, responsive to transitioning to the emergency communication mode, additional steps. The additional steps can include setting a second timer, collecting user information and live location information for the device, transmitting, via the at least one communications interface, a request for assistance to a remote server, and establishing, via the at least one communications interface, a communications session based on the second timer. In the communications device, the communication session is established using default emergency contact information at the communications device if the second timer expires prior to receiving a response to the request from the remote server, else the communications session is established using emergency contact information in the response.

In the communications device, the instructions can further include instructions for causing the processor perform the steps of detecting an abort signal at the communications device and, upon detecting the abort signal, cancelling the request and preventing establishing of the communications session.

In the communications device, the instructions for the collecting of live location information can further include instructions for causing the processor to perform, via the at least one communications interface, various steps. The steps can include acquiring one or more sets of location information for the communications device via at least one of a geo-location system associated with the device, a primary communications network for the device, and a secondary communications network to yield acquired location, determining an accuracy of each of the sets of location information, and selecting as the live location information the one of the sets of location information associated with the accuracy that is highest.

In a third embodiment, a method for forward emergency contact information to a user communications device is provided. The method includes obtaining, from a user communications device, user information and live location information for the user communications device. The method also includes setting a timer and, based on the user information and the live location information, generating a hidden incident object associated with the remote communications device. The method also includes, upon an expiry of the timer, making the hidden incident object visible to yield a visible incident object and forwarding contact information for a selected response authority to the remote communications device based on the live location information extracted from the visible incident object.

In the method, the forwarding can include parsing the visible incident object to extract the live location information and identifying a one of the at least one response authority having a service area intersecting the live location information to yield the selected response authority.

The method can also include determining that an abort signal has been received from the remote communications device and a state of the timer and, upon determining that an abort signal has been received and that the state of the timer indicates that the timer has not expired, deleting the hidden incident object.

BRIEF DESCRIPTION OF THE DRAWINGS

FIG. 2 shows a flow chart of steps in an exemplary method for transitioning a user communications device to an emergency communications mode in accordance with the various embodiments;

FIG. 3 shows a flow chart of steps in an exemplary method for establishing, during an emergency communications mode, a communications session between a user communications device and an emergency response server in accordance with the various embodiments;

FIG. 4 is a flowchart of steps in an exemplary method for determining, during an emergency communications mode, live local information associated with a user communications device and to be shared with an emergency response server in accordance with the various embodiments;

FIG. 6 is flowchart of steps in an exemplary method for processing a request for assistance received from a user communications device at an emergency response server in accordance with the various embodiments.

Figure 1A:
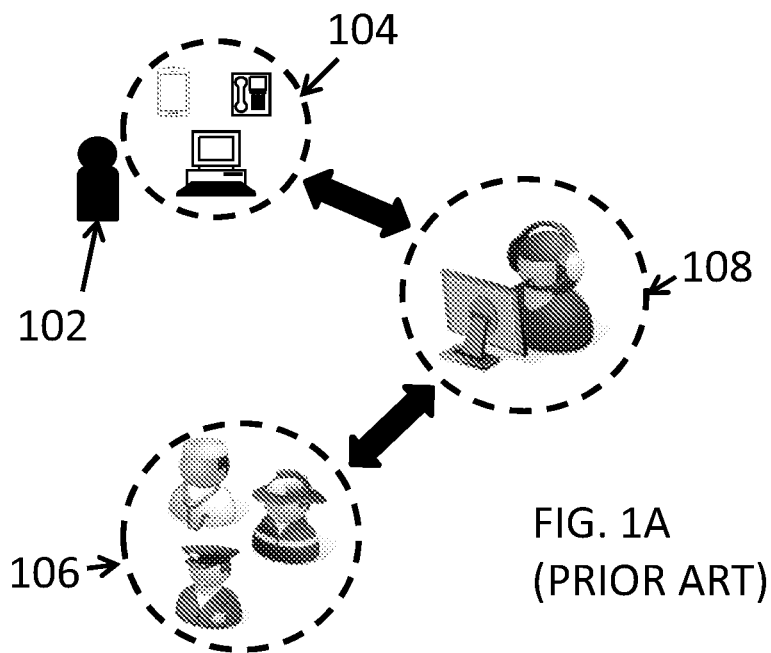
FIG. 1*a* is a schematic that shows a general operation of a traditional emergency response system.

Some of the figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk or the like). Similarly, the programs may be standalone programs, may be incorporated as subroutines in an operating system, may be functions in an installed imagining software package, and the like.

It should be understood that the various embodiments are not limited to the arrangements and instrumentality shown in the drawings.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

In view of the limitations of existing emergency response systems, the various embodiments are directed to new systems and methods for providing an enhanced and personalized emergency response system. In the various embodiments, rather than relying on specialized equipment or exclusively relying on a monitoring service, the various embodiments are configured to take advantage of the advanced capabilities and popularity of devices now typically carried by an individual on his person, such as smartphones, tablets, and laptop computers, to name a few. In particular, the various embodiments are directed to systems and methods to provide enhanced capabilities to such devices to allow a user in an emergency situation to: (1) initiate the process of contacting emergency response services more quickly and (2) ensure that the user is placed in contact with the most appropriate emergency response services. A general operation of the system and method of the various embodiments is described below with respect to FIGS. 1A and 1B.

Figure 1B:
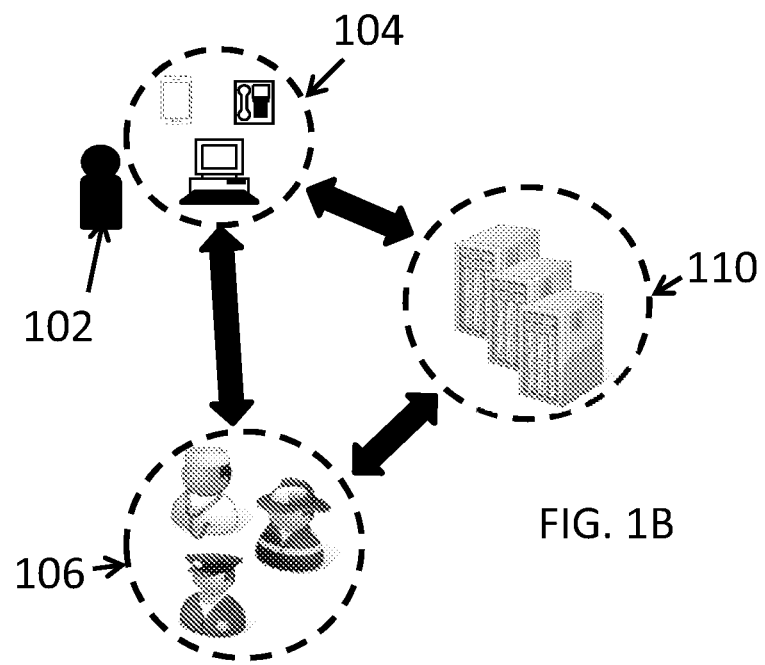
FIG. 1B is a schematic that shows a general operation of the various embodiments.

FIGS. 1A and 1B schematically illustrate the general operation of the various embodiments versus that of traditional systems and methods. In the traditional emergency response system or a monitoring system, as shown in FIG. 1A, a user 102 would utilize a communications devices 104 (e.g., mobile phone, wired phone, computer, etc.) to place a call to a 911 dispatcher or the monitoring service 108 to contact emergency response services 106. An agent at the monitoring service 108 would then interact with the user 102 and either place the user in communications with an appropriate one of emergency response services 106 or dispatch an appropriate one of emergency response services to the user's location.

Unfortunately, as noted above, 911 or monitoring service personnel may only receive limited information regarding the user or the location of the user. For example, in the case of a 911 call, the dispatch may automatically receive some location information. Sometimes this can be GPS information (E-911 services), but in many other cases only an address associated with the call is received. However, this location data fails to provide detailed information on the location of the caller within an area encompassed by typical 911 information. For example, typically 911 information will lack an exact location of the caller at the address associated with the call. Moreover, in the case of 911 calls, no information regarding the user is provided and must be obtained from the user during the call. At the most, only the information associated with the subscriber of a phone line may be provided, which may or may not be different from that of the caller. Similar deficiencies are typical in the case of a monitoring service.

As also noted above, obtaining assistance via 911 or a monitoring service is typically a two-step process. That is, a user must first contact a central dispatcher or monitoring service to seek assistance. Thereafter, the monitoring service contacts the emergency response services on behalf of the user. The result is that delays are built into this process, even when assistance is already at a location relatively close to the user. For example, referring back to the college or university campus scenario, an on-campus emergency could be more quickly attended to by campus emergency response services if they were aware of the emergency.

To address the deficiencies of the traditional system of FIG. 1A, new systems and methods are provided in the various embodiments. These systems and methods of the various embodiments are generally described with respect to FIG. 1B. The various embodiments allow more detailed user and location information to be provided to emergency response services and more accurate dispatching of emergency response services to assist the user. The system of FIG. 1B operates as follows.

First, a user 102, during an emergency, can place his device 104 in an emergency communications mode. This can be via a relatively simple action or series of actions, as discussed below with respect to FIG. 2. Prior to the establishment of the emergency mode, the device 104 can be pre-configured to store additional information regarding the user that might be useful for emergency response personnel. This is also discussed in greater detailed with respect to FIG. 2. Additionally, the device 104 can determine a most accurate measure of its location based on communications networks being used by the device 102 or geo-location information the device 102 can obtain. This is discussed in greater detail with respect to FIGS. 3, 4, and 5. Once placed in an emergency communications mode, the device 102 can then communicate with a server 110 to (1) provide its user and location information thereto and (2) obtain information regarding the most appropriate one of emergency response services 106 to seek assistance from. Thereafter, the device 104 can place a call to the one of emergency response services 106. In some cases, automatically. Concurrently, the server 110 can forward the enhanced user and location information to the one of emergency response services 106. Thus, the emergency response services 106 are immediately placed in contact with the user 102 while receiving additional information for responding to the emergency.

The advantages of the foregoing process are at least threefold. First, users are placed in contact with the correct emergency response service. For example, if the server 110 determines that a user 102 is on a college or university campus, the user 102 is placed in contact with on-campus emergency response services (who are likely going to be the quickest responders) rather than contacting a central 911 dispatch system for the city or surrounding larger region. Second, emergency response personnel can be provided with enhanced user and location information without the need for significant interaction with the user. Third, since the server 110 receives additional user information and enhanced location information for the user, the emergency response personnel can be provided not just a better location for the emergency (i.e., can more efficiently reach the user), but the enhanced user information can provide them with more information on who they are looking for and what they might expect from the user. For example, if the user becomes unconscious, a description of the user can be used by personnel to determine they have reached the user that seeking assistance. Similarly, critical medical information can be forwarded to the emergency response personnel.

As noted above, one aspect of the various embodiments is to provide a methodology that allows users to be placed in contact more quickly with emergency response personnel as compared to traditional means using 911. In the various embodiments, this can be achieved by taking advantage of the expandability and configurability of devices such as smartphones, tablet devices, netbooks, laptops, and other computing devices. In particular, an application or program can be installed or provided for such devices. Such an application can initially run in the background or in a "listening" mode. The application can then be configured to monitor for certain types of activities and thereafter place the device in an "emergency" mode to allow the user to summon aid. The operation of such an application is described with respect to FIG. 2.

Although the various embodiments will be described primarily with respect to an application installed or otherwise operating on a smartphone, the various embodiments are not limited in this regard. Rather, the functionality of the application can be implemented in any type of communications device, including, but not limited to, other types of mobile phones, tablet devices, netbooks, laptop computers, desktop computers, landline phone, or any other type of computing devices that can be programmed to provide the functionality described below.

FIG. 2 shows a flow chart of steps in an exemplary method 200 for transitioning a user communications device to an emergency communications mode in accordance with the various embodiments. The method can begin at step 202 and continue on to step 204. At step 204, the communication device can be transitioned to a listening mode. That is, as described above, the application can be configured to initially operate in the background. Contemporaneously with step 204, a timer can be reset at step 206. The time can be configured to initiate a countdown of a specified length or to count up a certain amount of time. In the various embodiments any lengths of time can be used. For example, the length of time can be as long as 10 minutes in some embodiments. In another example, to avoid accidental activation, shorter time periods can be used, such as 60, 45, 30, or 10 seconds. In the various embodiments, the timer can be implemented as a portion of the application or can be implemented as a separate hardware or software module operating on the communications device in conjunction with the application. In addition to steps 204 and 206, the method 200 can also being recording user interactions with the device at step 208.

The process to determine whether the communications device needs to be transitioned to an emergency mode can then begin at step 210. At step 210, the user interactions recorded at step 208 can be compared to one or more pre-defined patterns of user interactions. If the recorded user actions do not match the pre-defined patterns at step 210, the method 200 can continue recording the user interactions at step 208 and performing the comparison at step 210 until a match occurs. Thereafter, the method can proceed to step 212.

In the various embodiments, the pre-defined patterns can be selected to simplify the process of summoning assistance for the user. For example, on a smartphone, the pre-defined pattern can be a simple sequence of the activation of user buttons, other than the sequence for unlocking the screen. One exemplary pattern is the turning on and off of the user at least a certain number of times. However, the various embodiments are not limited to any specific pattern or sequence. For example, the activation methods could also include changing of volume, switching the vibrating state, pressing a "home" button or other main control button, using an external accessory to connect to the phone and changing toggling the pin configuration on the phone, or pressing the camera button repeatedly. Moreover, there can be multiple patterns that can be utilized. In some embodiments, each of the patterns can be associated with different users. Thus, a means can be provided for determining who is seeking assistance.

The relationships between lengths of time and patterns can be mathematically described, as shown below:

Lengths of time $\delta t_{j_x}$: is the change in time from one state configuration of the User Interface Components to the next indexed state configuration of the User Interface Components $t(\overline{S}_{j_x})$: is the time that the state configuration of the User Interface Components $\overline{S}_{j_x}$ occurred T: is the Total Time duration in which a pattern can occur $$\delta t_{j_x} = t(\overline{S}_{j_x}) - t(\overline{S}_{j(x-1)})$$

$$T = \sum_{l=1}^{x} \delta t_{j_l}$$

k: number of User Interface Components on the Phone

I={1, 2, 3, ..., k}: set of integers representing each User Interface Component on the phone R={1, 2, 3, . . . , $2^k$}: set of integers representing each unique state Combination of all of the User Interface Components $$\overline{S} = \begin{bmatrix} S_{R_1 I_1} & \cdots & S_{R_1 I_k} \\ \vdots & \ddots & \vdots \\ S_{R_{2^k} I_1} & \cdots & S_{R_{2^k} I_k} \end{bmatrix}:$$

the total state set, where each row of the matrix represents one of the unique combinational state configurations of the User Interface Components $\overline{S}_j = <S_{R_j I_1}, S_{R_j I_2}, S_{R_j I_3}, \ldots, S_{R_j I_k}>$: A specific unique combinational state configuration of the User Interface Components m: the number of combinational state configurations of the User Interface Components that the user enters, representing a pattern.

$\overline{S}_{jx}$: A specific unique combinational state configuration of the User Interface Components for a specific pattern index P: set of patterns $$P = \bigcup_{x=1}^{(2^k-1)^m} \left( \bigcup_{j=1}^{2^k} \overline{S}_{jx} \right)$$

Referring back to FIG. 2, if the pre-defined pattern occurs at step 210, it is then determined whether the pre-defined pattern occurred prior to the expiry of the timer at step 212. That is, whether or not the pre-defined pattern occurred within a specific timeframe. Such a configuration can be advantageous in other to distinguish between intentional and accidental entry of the sequence. For example, the user controls may be activated while the communication device in a user's pocket, purse, backpack, etc. However, as the period between such activations is likely long, a short timeframe can be specified to avoid any accidental summons for aid. In another example, there may be times in which some types of user interactions can coincide with the pre-defined pattern but that occur over a long period, such as turning the screen on and off. Again, the time period of the time can be specified as relatively short to avoid a pattern of activations over a couple hours to cause a summons for aid.

Referring back to FIG. 2, if the pre-defined pattern fails to occur before the expiration of the timer, the method 200 can revert to step 206 to reset the timer and repeat steps 208, 210, and 212 as necessary. In an alternative embodiment, the recording at step 208 can record not only the user interactions, but a also timestamp associated with such interactions. Thus, rather than relying on a timer at step 212, the method 200 can instead simply determine whether or not the first and last interactions for the pre-defined pattern occurred within a desired time period.

Once it is determined at step 212 that the pre-defined pattern occurred prior to expiry of the timer (or within a pre-defined period of time), the method 200 can proceed to step 214. In particular, the method 200 can determine at step 114 whether or not the communications device is already engaged in a persistent communications session. As used herein, a "persistent" communications session refers to a communication session with another user in which the device is continuously transmitting and/or receiving information for the communications session. For example, a determination can be made of whether or not the communications device is already engaged in a voice call, a video call, or the like. That is, if a user is engaged in such communications, it is likely that there is no emergency or that the user is already in contact with the appropriate persons. Thus, it would be inappropriate to interrupt an existing call.

While the communication device is engaged in a persistent communication session at step 214, the method 200 can revert either of steps 206 or 208. If the communications device is not engaged in a persistent communication session at step 214, the method can then proceed to step 216 to place the device in an emergency mode. The operation of the emergency mode will be described below with respect to FIG. 3. Once the user is out of the emergency mode, the method 200 can revert to step 204 to place the communication device in a listening mode and to repeat the method 200.

Turning now to FIG. 3, there is shown the operation of the emergency mode at the communications device. In particular, FIG. 3 shows a flow chart of steps in an exemplary method 300 for establishing, during an emergency communications mode, a communications session between a user communications device and an emergency response server in accordance with the various embodiments. Method 300 begins at step 302 in response to entering an emergency mode and proceeds to step 304.

At step 304, a timer can be started. Concurrently with the start of the timer at step 304, user information and live location information for the user can be collected at step 306. The user information can be collected from a variety of sources. In some embodiments, this information can be pre-defined by the user on the device or on a remote server and retrieved as needed. In other embodiments, the user information can be aggregated from a collection of disparate sources, including local sources, remote sources, or a combination thereof. Thus, at step 306, the method 300 can cause the communications device to access the disparate sources and assemble the appropriate user information.

The user information can include any type of user information that could assist emergency response personnel in assisting or locating the user. For example, such information can include a visual description of the user, photographs of the user, medical history of the user, an address of the user, emergency contact information for the user, and a description of a vehicle associated with the user, to name a few. However, any other type of information can be provided in the various embodiments.

Figure 5:
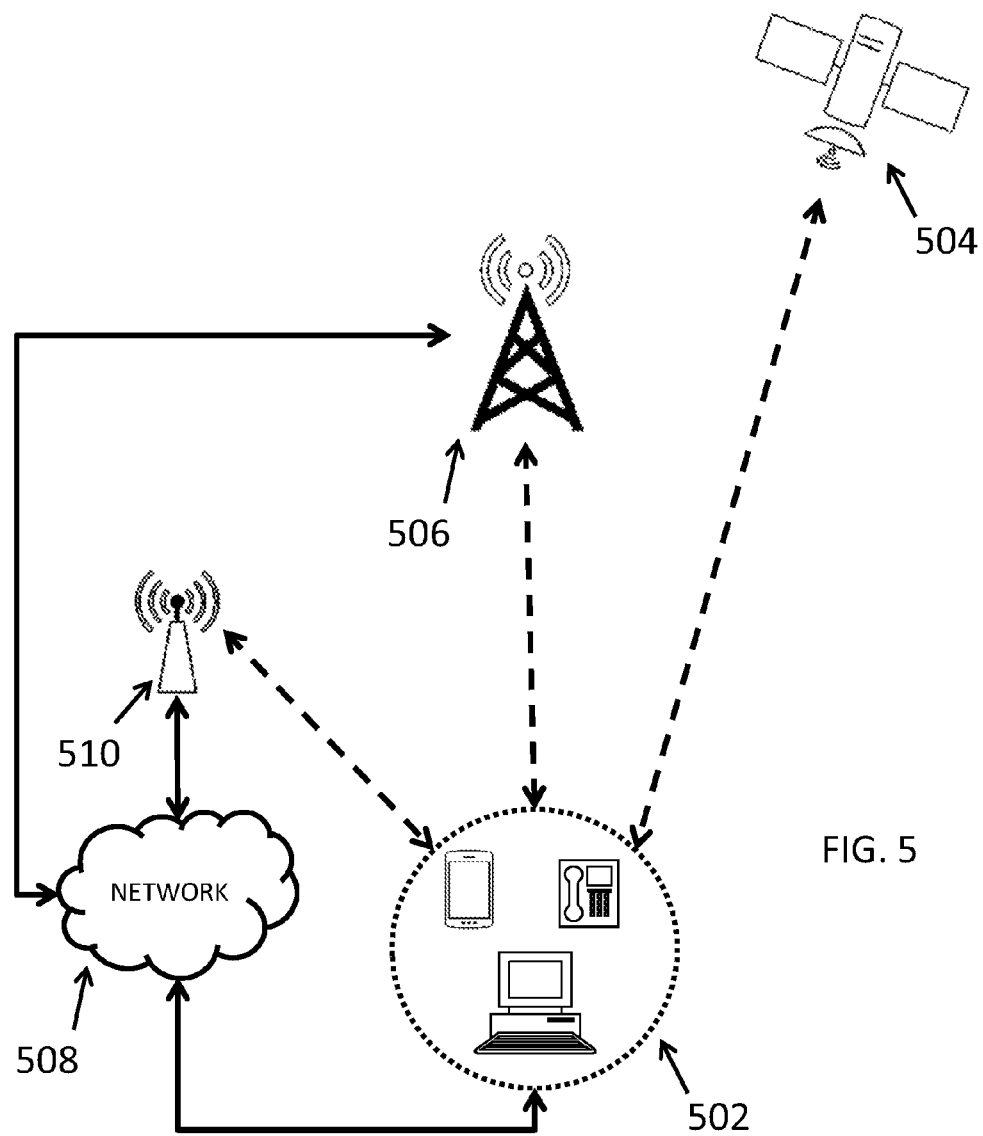
FIG. 5 is a schematic that is useful for describing the exemplary method of FIG. 4.

As the live location information, this information can also be obtained in a variety of ways, as illustrated in FIGS. 4 and 5. FIG. 4 is a flowchart of steps in an exemplary method 400 for determining, during an emergency communications mode, live local information associated with a user communications device and to be shared with an emergency response server in accordance with the various embodiments. FIG. 5 is a schematic that is useful for describing the exemplary method of FIG. 4.

In method 400, the live location information can be obtained by combining information from a variety of sources and then providing the location believed to be most accurate. In particular, method 400 can begin at step 402 and proceed to step 404. At step 404, location information for a communications device can be acquired using a geo-location device. For example, as shown in FIG. 5, the device 502 can be configured to using a global positioning system (GPS) information 504 or the like to obtain location information. Contemporaneously with step 404, location information can also be acquired from or based on a primary communication network for the communications device at step 406. For example, in the case of communications device 502 being a mobile phone, the cellular networks servicing the phone can be utilized to provide or derive location information based on the location of the cell tower 506 servicing the smartphone. The deriving of such information can be performed on the communications device 502 itself or the relevant information can be forwarded to a server or other remote computing device (not shown) on network 508 to determine the location information. Additionally, if available, location information can also be acquired from or based on a secondary communication network for the communications device at step 408 contemporaneously with steps 404 and 406. For example, the communications device 502 can be communicatively coupled to a local wireless network 510 (e.g., via WiFi, Bluetooth, or other IEEE 802.11 communications links) or a local wired network. Based on known information regarding such networks, a location can be derived. Again, the deriving of such information can be performed on the communications device 502 itself or the relevant information can be forwarded to a server or other remote computing device (not shown) on network 508 to determine the location information.

Once the location information from the various sources is obtained, the method 400 can proceed to step 410 to determine which of the location information is believed to be most accurate. Thereafter, the location information that is believed to be most accurate is selected at step 412 to be the live location information. The method can then resume previous processing at step 414.

In some embodiments, the live location information can be dynamically adjusted. That is, it can be continuously updated by the communications device. Thus, even as the user moves, his current location information can be transmitted to emergency response personnel.

One exemplary implementation is provided below for the example of FIG. 5 (GPS, cellular network, and local wireless (WiFi) network).

1.1. Definitions 1.1.1. "The Assembly File"
The application has a file that all system variables are declared and that initializes the application when the application is installed, or when the phone is started. This file will hence forth be referred to herein as The Assembly File.

1.1.2. "The Service"
FIG. 1 represents the process by which the application is able to bring a specified application to the foreground for the user to interact with (e.g., by means of toggling the state of the Screen). This is accomplished by creating a background receiver and background service (launched in the foreground) pair that listens for the screen's state (e.g., which can be toggled by pressing the power button). The background receiver listens to pre-defined commands that are designated in the Assembly file. When the background receiver receives a command that is specified in The Assembly File, the command is passed to the background service (that is started in the foreground). The background service takes the command passed from the background receiver and goes through a series of if then statements to determine what to do with that command. This process occurs in every background task, and will hence forth be referred to as The Service.

1.1.3. "Signal Strength"
The energy value of any RF communication link represented in Decibels or dBm 1.1.4. "Geo Location"
A longitude and latitude value that represents a point in space on the earth 1.1.5. "Satellite Signal"
Satellite Signal is a communication link between a GPS Satellite and a device. The communication link returns data from the GPS Satellite that encodes a variety of information including satellite positions, the state of the internal clocks, and the health of the network. These signals are transmitted on two separate carrier frequencies that are common to all satellites in the network. Two different encodings are used: a public encoding that enables lower resolution navigation, and an encrypted encoding used by the U.S. military 1.1.6. "Satellite Position"
Geo Location that is determined by a Satellite Signal 1.1.7. "Network Signal"
Communications links from Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), or Integrated Digital Enhanced Network (iDEN).

1.1.8. "Network Position"
Geo Location that is determined by a Network Signal, and the Signal Strength 1.1.9. "Wi-Fi Signal"
Any wireless local area network (WLAN) products that are based on the Institute of Electrical and Electronics Engineers (IEEE) 802.11 standards 1.1.10. "Wi-Fi Position"
Geo Location that is determined by accessing a commercial provider such as Google, Navizon or Skyhook Wireless, that returns a Geo Location when you provide information on the Wi-Fi Signal, and the Signal Strength.

1.1.11. "Location Accuracy"
Location Accuracy is the radius from a Geo Location that the device requesting the Geo Location, by means of Wi-Fi Position, Network Position, or Satellite Position, could dwell within.

1.1.12. "Return Geo Location"
The Return Geo Location is a Geo Location that the system returns for use in other parts of the application.

1.1.13. "The Location Timer"
When The Service receives a specific command that is declared in The Assembly File, a set Integer that is declared in The Assembly File is decremented every clock cycle of the operating system. When the integer reaches zero, The Service will send a command that will reset the integer to the original value set in The Assembly File. The Service will then send the Return Geo Location Signal. This set of sequential events will hence forth be referred to as The Location Timer.

1.1.14. "Return Geo Location Signal"
The Return Geo Location Signal is a signal that is sorted by The Service and triggers the capturing of the Return Geo Location 1.1.15. "Get Geo Location Signal"
The Return Geo Location Signal is a signal that is sorted by The Service and triggers the start of the process required to get a Geo Location

1.2. Equation Variables $P_{Sn}(r_{Sn}, \phi_{Sn}, \lambda_{Sn}, t_{Sn})$ is the most recent Satellite Position,
$P_{S(n-1)}(r_{S(n-1)}, \phi_{S(n-1)}, \lambda_{S(n-1)}, t_{S(n-1)})$ is the Last Satellite Position,
$P_{Wn}(r_{Wn}, \phi_{Wn}, \lambda_{Wn}, t_{Wn})$ is the most recent Wi-Fi Position,
$P_{W(n-1)}(r_{W(n-1)}, \phi_{W(n-1)}, \lambda_{W(n-1)}, t_{W(n-1)})$ is the Last Wi-Fi Position,
$P_{Nn}(r_{Nn}, \phi_{Nn}, \lambda_{Nn}, t_{Nn})$ is the most recent Network Position,
$P_{N(n-1)}(r_{N(n-1)}, \phi_{N(n-1)}, \lambda_{N(n-1)}, t_{N(n-1)})$ is the Last Network Position,
$D_S(r_{Sn}, \phi_{Sn}, t_{Sn}, t_{Sn}, r_{S(n-1)}, \lambda_{S(n-1)}, \lambda_{S(n-1)}, t_{S(n-1)})$ is the distance between the last Satellite Position and the most resent Satellite Position,
$D_W(r_{Wn}, \phi_{Wn}, \lambda_{Wn}, t_{Wn}, r_{W(n-1)}, \phi_{W(n-1)}, \lambda_{W(n-1)}, t_{W(n-1)})$ is the distance between the last Wi-Fi Position and the most resent Wi-Fi Position,
$D_N(r_{Nn}, \phi_{Nn}, \lambda_{Nn}, t_{Nn}, r_{N(n-1)}, \phi_{N(n-1)}, \lambda_{N(n-1)}, t_{N(n-1)})$, the distance between the last Network Position and the most resent Network Position,
Abs( ) is the absolute value of those variables
$R_e$ is the radius of the earth
$r_{Sn}$ is the Location Accuracy of the most recent Satellite Position,
$\phi_{Sn}$ is the latitude of the Geo Location of the most recent Satellite Position in decimal degrees,
$\lambda_{Sn}$ is the latitude of the Geo Location of the most recent Satellite Position in decimal degrees,
$t_{Sn}$ is the system time that the most recent Satellite Position was received,
$r_{S(n-1)}$ is the Location Accuracy of the Last Satellite Position,
$\phi_{S(n-1)}$ is the latitude of the Geo Location of the Last Satellite Position in decimal degrees,
$\lambda_{S(n-1)}$ is the latitude of the Geo Location of the Last Satellite Position in decimal degrees,
$t_{S(n-1)}$ is the system time that the Last Satellite Position was received,
$r_{Wn}$ is the Location Accuracy of the most recent Wi-Fi Position,
$\phi_{Wn}$ is the latitude of the Geo Location of the most recent Wi-Fi Position in decimal degrees, $\lambda_{Wn}$ is the latitude of the Geo Location of the most recent Wi-Fi Position in decimal degrees,
$t_{Wn}$ is the system time that the most recent Wi-Fi Position was received,
$r_{W(n-1)}$ is the Location Accuracy of the Last Wi-Fi Position,
$\phi_{W(n-1)}$ is the latitude of the Geo Location of the Last Wi-Fi Position in decimal degrees,
$\lambda_{W(n-1)}$ is the latitude of the Geo Location of the Last Wi-Fi Position in decimal degrees,
$t_{W(n-1)}$ is the system time that the Last Wi-Fi Position was received,
$r_{Nn}$ is the Location Accuracy of the most recent Network Position,
$\phi_{Nn}$ is the latitude of the Geo Location of the most recent Network Position in decimal degrees,
$\lambda_{Nn}$ is the latitude of the Geo Location of the most recent Network Position in decimal degrees,
$t_{Nn}$ is the system time that the most recent Network Position was received,
$r_{N(n-1)}$ is the Location Accuracy of the Last Network Position,
$\phi_{N(n-1)}$ is the latitude of the Geo Location of the Last Network Position in decimal degrees,
$\lambda_{N(n-1)}$ is the latitude of the Geo Location of the Last Network Position in decimal degrees,
$t_{N(n-1)}$ is the system time that the Last Network Position was received

1.3. The Satellite Distance Equation $$D_S(P_{Sn}(r_{Sn}, \phi_{Sn}, \lambda_{Sn}, t_{Sn}), P_{S(n-1)}(r_{S(n-1)}, \phi_{S(n-1)}, \lambda_{S(n-1)}, t_{S(n-1)})) =$$
$$D_S(r_{Sn}, \phi_{Sn}, \lambda_{Sn}, t_{Sn}, r_{S(n-1)}, \phi_{S(n-1)}, \lambda_{S(n-1)}, t_{S(n-1)}) =$$
$$2 \cdot R_e \sin^{-1}\left(\sqrt{\begin{array}{l}\sin^2(\frac{\pi}{360} \cdot abs(\phi_{S(n-1)} - \phi_{Sn})) + \cos(\frac{\pi}{180} \cdot \phi_{Sn}) \cdot \\ \cos(\frac{\pi}{180} \cdot \phi_{S(n-1)}) \cdot \sin^2(\frac{\pi}{360} \cdot abs(\lambda_{S(n-1)} - \lambda_{Sn}))\end{array}}\right)$$

1.4. The Wi-Fi Distance Equation $$D_W(P_{Wn}(r_{Wn}, \phi_{Wn}, \lambda_{Wn}, t_{Wn}), P_{W(n-1)}(r_{W(n-1)}, \phi_{W(n-1)}, \lambda_{W(n-1)}, t_{W(n-1)})) =$$
$$D_W(r_{Wn}, \phi_{Wn}, \lambda_{Wn}, t_{Wn}, r_{W(n-1)}, \phi_{W(n-1)}, \lambda_{W(n-1)}, t_{W(n-1)}) =$$
$$2 \cdot R_e \sin^{-1}\left(\sqrt{\begin{array}{l}\sin^2(\frac{\pi}{360} \cdot abs(\phi_{W(n-1)} - \phi_{Wn})) + \cos(\frac{\pi}{180} \cdot \phi_{Wn}) \cdot \\ \cos(\frac{\pi}{180} \cdot \phi_{W(n-1)}) \cdot \sin^2(\frac{\pi}{360} \cdot abs(\lambda_{W(n-1)} - \lambda_{Wn}))\end{array}}\right)$$

1.5. The Network Distance Equation $$D_N(P_{Nn}(r_{Nn}, \phi_{Nn}, \lambda_{Nn}, t_{Nn}), P_{N(n-1)}(r_{N(n-1)}, \phi_{N(n-1)}, \lambda_{N(n-1)}, t_{N(n-1)})) =$$
$$D_N(r_{Nn}, \phi_{Nn}, \lambda_{Nn}, t_{Nn}, r_{N(n-1)}, \phi_{N(n-1)}, \lambda_{N(n-1)}, t_{N(n-1)}) =$$
$$2 \cdot R_e \sin^{-1}\left(\sqrt{\begin{array}{l}\sin^2(\frac{\pi}{360} \cdot abs(\phi_{(n-1)} - \phi_n)) + \cos(\frac{\pi}{180} \cdot \phi_n) \cdot \\ \cos(\frac{\pi}{180} \cdot \phi_{(n-1)}) \cdot \sin^2(\frac{\pi}{360} \cdot abs(\lambda_{(n-1)} - \lambda_n))\end{array}}\right)$$

The following then represents the process by which the application is able to determine the Geo Location of the phone on which the application is installed. When The Service receives the Get Geo Location Signal, The Service starts The Location Timer, then attempts to establish a connection to a Satellite Signal, attempts to establish a connection to a Wi-Fi Signal, and attempts to establish a connection to a Network Signal all asynchronously. All connections are attempted until The Service either receives the Return Geo Location Signal or a connection is established. If a connection is established to a Satellite Signal, The Service determines Signal Strength and requests the Geo Location from the Satellite Signal. When the Satellite Signal returns the Geo Location, The Service stores the Geo Location Data as the most resent Satellite Position. If the time difference between the last Satellite Position and the most resent Satellite Position is Greater than a number of seconds that is stated in The Assembly File, or if the distance, determined by The Satellite Distance Equation, between the last Satellite Position and the most resent Satellite Position is greater than a number meters that is stated in The Assembly File, then The Service changes the value of the last Satellite Position to the value of the most recent Satellite Position. If a connection is established to a Wi-Fi Signal, The Service determines Signal Strength and requests the Geo Location from the Wi-Fi Signal. When the Wi-Fi Signal returns the Geo Location, The Service stores the Geo Location Data as the most resent Wi-Fi Position. If the time difference between the last Wi-Fi Position and the most resent Wi-Fi Position is Greater than a number of seconds that is stated in The Assembly File, or if the distance, determined by The Wi-Fi Distance Equation, between the last Wi-Fi Position and the most resent Wi-Fi Position is greater than a number meters that is stated in The Assembly File, then The Service changes the value of the last Wi-Fi Position to the value of the most recent Wi-Fi Position. If a connection is established to a Network Signal, The Service determines Signal Strength and requests the Geo Location from the Network Signal. When the Network Signal returns the Geo Location, The Service stores the Geo Location Data as the most resent Network Position. Once the most resent Network Position is determined The Service compares the last Network Position and the most resent Network Position, by means of the Location Accuracy of the last Network Position and the most resent Network Position, and the time difference between the last Network Position and the most resent Network Position. If the time difference between the last Network Position and the most resent Network Position is Greater than a number of seconds that is stated in The Assembly File, or if the distance, determined by The Network Distance Equation, between the last Network Position and the most resent Network Position is greater than a number meters that is stated in The Assembly File, then The Service changes the value of the last Network Position to the value of the most recent Network Position. Upon completion of The Location Timer, the last Satellite Position the last the last Wi-Fi Position, and the last Network Position are all compared, and the Geo Location with the smallest Location Accuracy is set as the Return Geo Location and then sent to the Web Application (remote server) for computation.

It should be noted that the foregoing description is but one possible implementation for determining a location of a communications device. Accordingly, any other methods for selecting between different location measurements or computations can be utilized in the various embodiments.

Now referring back to FIG. 3, once user information and live location information is collected at step 306, the method can proceed to step 308. At step 308, the computing device can assemble and transmit a request to a remote server for assistance and emergency contact information. Thereafter, the computing device can determine if the timer set at step 304 has elapsed at step 310. If the timer has not yet elapsed, the communications device can wait for the server to respond and proceed to step 312. At step 312, the communications device can monitor for a user abort signal. The user abort signal can be provided in a variety of ways. In some embodiments, a user abort signal can be generated when the user unlocks a phone or otherwise proceeds to perform some normal function of the communications device. In other embodiments, a user abort signal can be generated by an alternate sequence of user interactions. However, the various embodiments are not limited to any specific method for providing a user abort signal.

If a user abort signal is not detected at step 312, the method can repeat steps 310 and 312 using the timer has elapsed or the user abort signal is detected. In the case of a user abort signal being detected, the method can proceed to step 314. At step 314, the request to the remote server can be cancelled. Further, and information collected for the request at the server can be purged by sending a request thereto. The method 300 can then resume previous processing at step 316.

If the time has elapsed, the method can proceed to step 318. At step 318, the communications device can determine whether or not it has received a response from the server. If a response from the server is detected at step 318, the method can proceed to step 320. At step 320, the contact information provided by the server can be utilized by the communications device to establishing a communications session with emergency response services. If no response from the server is detected at step 318, the method can instead proceed to step 322. At step 322, since no contact information has been provided by the server, stored or default contact information can be utilized by the communications device to establishing a communications session with emergency response services. Such a configuration not only allows a user to be provided with information for contacting the most appropriate emergency response services, but also prevents delays is assistance. That is, by allowing a default communications session to be established, the user can at least contact someone who can provide aid. For example, referring again to the college or university campus scenario, if the server is unable to provide information for contacting on-campus emergency response services, the user will be placed in contact with a default contact, such as 911, to ensure that call for aid do not go unheeded.

The description above describes that a communication session is established automatically. Such a configuration is advantageous as the user need only provide the pre-defined pattern to obtain assistance. However, the various embodiments are not limited in this regard. In some configurations, the communications device can be configured to prompt the user as to whether the communication session should be established.

Once the communications session is established, the method 300 can then resume previous processing at step 316.

Another aspect of the various embodiments is to provide a server for interacting with the user communications devices operating according to the methods described above and to forward information, as necessary, to emergency response services. This process is illustrated below with respect to FIG. 6.

FIG. 6 is flowchart of steps in an exemplary method 600 for processing a request for assistance received from a user communications device at an emergency response server (i.e., the remote server) in accordance with the various embodiments. The method 600 begins at step 602 and proceeds to step 604. At step 604, the remote server can receive the request from the user that includes user information and live location information, as discussed above. Upon receipt of such information at step 604, the method 600 proceeds to step 606 to start a timer. Contemporaneously with step 604, the method 600 creates a new incident object at step 608 and sets the incident object to a hidden mode. The incident object can include the user and live location information from the request or any subset thereof. Further, the object can be formatted or otherwise arranged in any way suitable for processing by the remote service. Additionally, the incident object can be configured so that the remote server is prevented from processing the incident object or the incident object is otherwise made unavailable for processing. For example, incident objects can be "hidden" by placing them in a specific memory location or queue.

Once the hidden incident object is created at step 608, the method can determine if the timer has been elapsed at step 610. If the timer has not elapsed at step 610, the method can proceed to step 612 to determine whether or not a user abort signal has been received from the communications device. If the abort signal is received, the incident is cancelled (and can be deleted as well) at step 614. The method can then resume previous processing at step 616. If the abort signal is not received, the method can repeat steps 610 and 612 until the time elapses or the abort signal is received. After the timer elapses at step 610, and if no abort signal is detected at step 612, the method can proceed to step 618. At step 618, the incident object can be placed in a visible mode to allow the incident object to be processed.

Once the incident object is visible, the live location information can be extracted from the visible incident object at step 620. For example, a parsing of the incident object can be performed. The live location information can then be compared to service area information for different emergency response service providers to identify which of the service areas intersect with the live location information at step 622. Thereafter, at step 624, contact information for an identified emergency response authority can be forwarded to the user communications device.

In some cases, it is possible that the live location information may intersect with service areas for various emergency response service providers. In these cases, a set of rules can be specified for determining which of the emergency response service providers should be selected for the user. In some embodiments, the most local emergency response service provider can be selected. For example, in the case of a college or university campus, this may fall within the service area of on-campus and off-campus emergency response service providers. In this case, the on-campus emergency response personnel may be more appropriate and may be able to respond more quickly. However, in other cases, the user information may be utilized as well. For example, in the case of a college or university campus again, if the user information indicates that the person is not affiliated with the college or university, off-campus emergency response personnel may be more appropriate. In still other configurations, the response time for the service areas can also be considered. For example, if a user is at a location where service areas overlap; the emergency response service with a fastest response time may be selected to avoid undue delays in assistance. The foregoing examples should not be considered limiting in any regard. Rather, any other types of rules, based on user information, location information, service areas, emergency response provider information, and/or any other type of information can be used in the various embodiments.

In particular configurations, the mode of activation can also be used to determine the emergency service provider. As noted above, different pre-defined patterns may be provided for the user to activate the emergency mode. In some embodiments, these different pre-defined patterns can each be associated with different emergency types (e.g., medical, fire, crime, etc.). Thus, the type of emergency reported can also dictate which emergency response personnel (e.g., paramedics, fireman, police, etc.) should be placed in contact with the user.

Referring back to FIG. 6, contemporaneously with the forwarding of contact information to the user at step 624, user and live location information from the incident object can also be forwarded at step 626 to the emergency response service identified at step 622. At step 626, all or a portion of the information from the incident object can be selected. In some configurations, the amount of information shared can be limited based on criteria specified at the communications device, the remote server, or both. For example, the information can be limited to solely that needed by the emergency response personnel to identify and assist the user. Thus, any other information in the incident object can be held back. For example, in the case of a college or university campus again, whether or not the user is affiliated with the college or university may be irrelevant for off-campus emergency response service providers. Alternatively, the user can "opt out" of sharing certain types of information that would normally be shared. Thus, different amounts of information may be shared for different types of users.

In some cases, the information forwarded to the emergency response service providers can also be updated over time. For example, if the user is moving, the updated live location information can be forwarded to the emergency response service provider, as described above. In another example, the remote server may supplement the information in the incident object and the supplemented information may be sent at a later time. For example, the remote server may be configured to add description or medical information for a user, hazard information for a particular location, or any other information it has access to. However, some of this information may not be immediately accessible. Thus, the remote server can send an initial set of data regarding the user and the live location and thereafter supplement with additional information as it become available.

Once the information is sent at step 626, the method 600 can end at step 616 and resume previous processing.

Figure 7A:
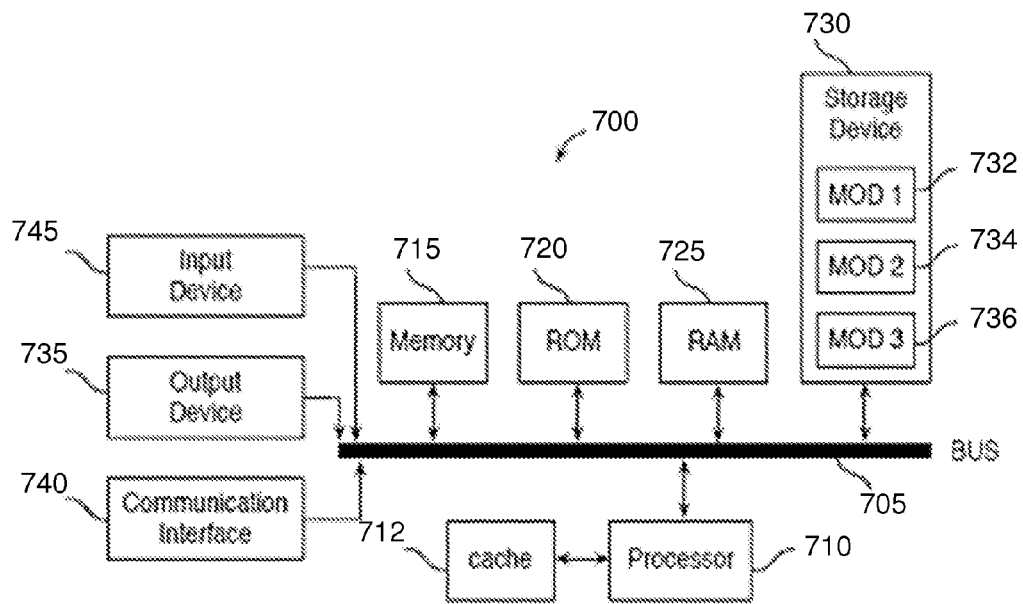
FIGS. 7A and 7B illustrate an exemplary computing device for carrying out the various embodiments.
Figure 7B:
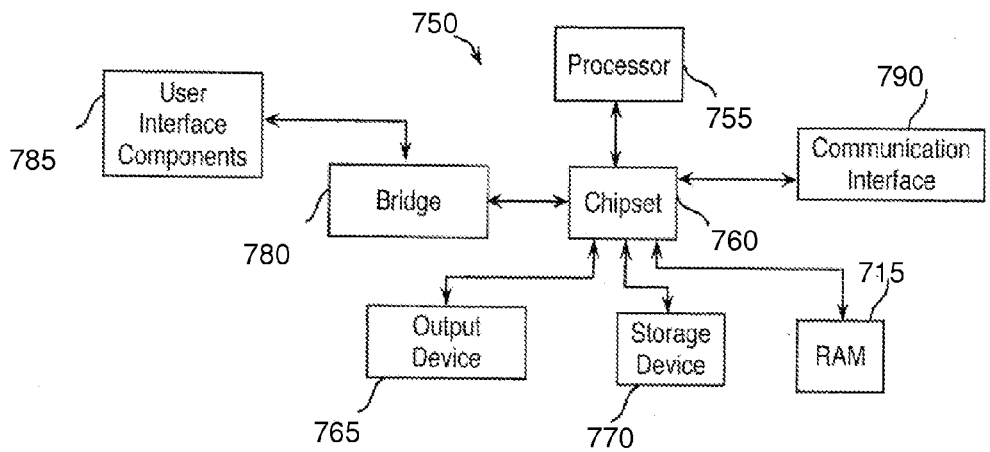

FIG. 7A and FIG. 7B illustrate exemplary possible configurations for a computing device for implementing the various embodiments. The more appropriate embodiment will be apparent to those of ordinary skill in the art when practicing the present technology. Persons of ordinary skill in the art will also readily appreciate that other system embodiments are possible. FIG. 7A illustrates a conventional system bus computing system architecture 700 wherein the components of the system are in electrical communication with each other using a bus 705.

Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed. Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method, comprising:
    transitioning a communications device associated with a user to a listening mode;
    setting a first timer in the communications device;
    recording, at the communications device, user actions with the communications device;
    ascertaining, based on a status of the first timer and the user actions, whether the communications device meets criteria with respect to at least user interaction;
    if the communications device meets the criteria, transitioning the communications device to an emergency communications mode, else resetting the timer and repeating the recording and the ascertaining until the communications device meets the criteria.

2. The method of claim 1, wherein the ascertaining further comprises determining that the communications device meets the criteria by comparing a current pattern defined by the user actions with at least one pre-defined pattern of user action, and wherein the communications device is determined to meet the criteria if the current pattern substantially matches the pre-defined pattern.

3. The method of claim 2, wherein the ascertaining further comprises determining whether the timer has expired, and wherein the communications device is determined to meet the criteria if the current pattern substantially matches the pre-defined pattern prior to the expiry of the first timer.

4. The method of claim 2, wherein the pre-defined pattern comprises a pre-defined sequence of activation of user control elements on the communications device.

5. The method of claim 1, further comprising preventing the communications device from transitioning to the emergency communication mode if the communications device is currently engaged in a persistent communications session.

6. The method of claim 5, wherein the persistent communications session comprises one of a voice call or a video call.

7. The method of claim 1, further comprising performing, responsive to transitioning to the emergency communication mode, the steps of:
    setting a second timer in the communications device;
    collecting user information and live location information for the device
    transmitting a request for assistance to a remote server; and
    establishing a communications session based on the second timer, wherein the communication session is established using default emergency contact information at the communications device if the second timer expires prior to receiving a response to the request from the remote server, else the communications session is established using emergency contact information in the response.

8. The method of claim 7, wherein the request is cancelled and establishment of the communications session is prevented when an abort signal is detected at the device.

9. The method of claim 7, wherein the collecting of live location information comprises:
    acquiring one or more sets of location information for the device via at least one of a geolocation system associated with the device, a primary communications network for the device, and a secondary communications network to yield acquired location;
    determining an accuracy of each of the sets of location information;
    selecting as the live location information the one of the sets of location information associated with the accuracy that is highest.

10. A communications device, comprising:
    a processor;
    at least one control element communicatively coupled to the processor;
    a computer-readable medium, having stored thereon a plurality of instructions for causing the processor to perform the steps of:
    establishing a listening mode;
    setting a first timer;
    recording user actions with the at least one control element;
    ascertaining, based on a status of the first timer and the user actions, whether criteria with respect to at least user interaction has been met;
    if the criteria has been met, transitioning the communications device to an emergency communications mode, else resetting the timer and repeating the recording and the ascertaining until the criteria is met.

11. The communications device of claim 10, wherein the instructions for the ascertaining further comprise instructions for causing the processor to determine that the communications device meets the criteria by comparing a current pattern defined by the user actions with at least one pre-defined pattern of user action, and wherein the criteria is determined to be met if the current pattern substantially matches the pre-defined pattern.

12. The communications device of claim 11, wherein the instructions for the ascertaining further comprise instructions for causing the processor to determine whether the timer has expired, and wherein the criteria is determined to be met if the current pattern substantially matches the pre-defined pattern prior to the expiry of the first timer.

13. The communications device of claim 11, wherein the pre-defined pattern comprises a pre-defined sequence of activation of the at least one control element.

14. The communications device of claim 10, further comprising instructions for causing the processor to prevent the transitioning to the emergency communication mode if the communications device is currently engaged in a persistent communications session.

15. The communications device of claim 14, wherein the persistent communications session comprises one of a voice call or a video call.

16. The communications device of claim 10, further comprising at least one communications interface communicatively coupled to the processor, and wherein the instructions further comprise instructions for causing the processor to perform, responsive to transitioning to the emergency communication mode, the steps of:
    setting a second timer;
    collecting user information and live location information for the device
    transmitting, via the at least one communications interface, a request for assistance to a remote server; and
    establishing, via the at least one communications interface, a communications session based on the second timer, wherein the communication session is established using default emergency contact information at the communications device if the second timer expires prior to receiving a response to the request from the remote server, else the communications session is established using emergency contact information in the response.

17. The communications device of claim 16, wherein the instructions further comprise instructions for causing the processor perform the steps of:
- detecting an abort signal at the communications device; and
- upon detecting the abort signal, cancelling the request and preventing establishing of the communications session.

18. The communications device of claim 16, wherein the instructions for the collecting of live location information further comprise instructions for causing the processor to perform, via the at least one communications interface, the steps of:
- acquiring one or more sets of location information for the communications device via at least one of a geolocation system associated with the device, a primary communications network for the device, and a secondary communications network to yield acquired location;
- determining an accuracy of each of the sets of location information;
- selecting as the live location information the one of the sets of location information associated with the accuracy that is highest.

\* \* \* \* \*

UNITED STATES PATENT AND TRADEMARK OFFICE
CERTIFICATE OF CORRECTION

PATENT NO.        : 9,071,957 B2                              Page 1 of 1
APPLICATION NO.   : 13/891223
DATED             : June 30, 2015
INVENTOR(S)       : Andrew Stadtlander and Mathew Hudson It is certified that error appears in the above-identified patent and that said Letters Patent is hereby corrected as shown below:

On title page 1, column 1, under (72) Inventors, the spelling for Inventor "Matthew Hudson" should read --Mathew Hudson--

Signed and Sealed this
Twenty-seventh Day of October, 2015

Michelle K. Lee
*Director of the United States Patent and Trademark Office*